Aug. 9, 1932.  J. A. RICHARDS  1,870,466

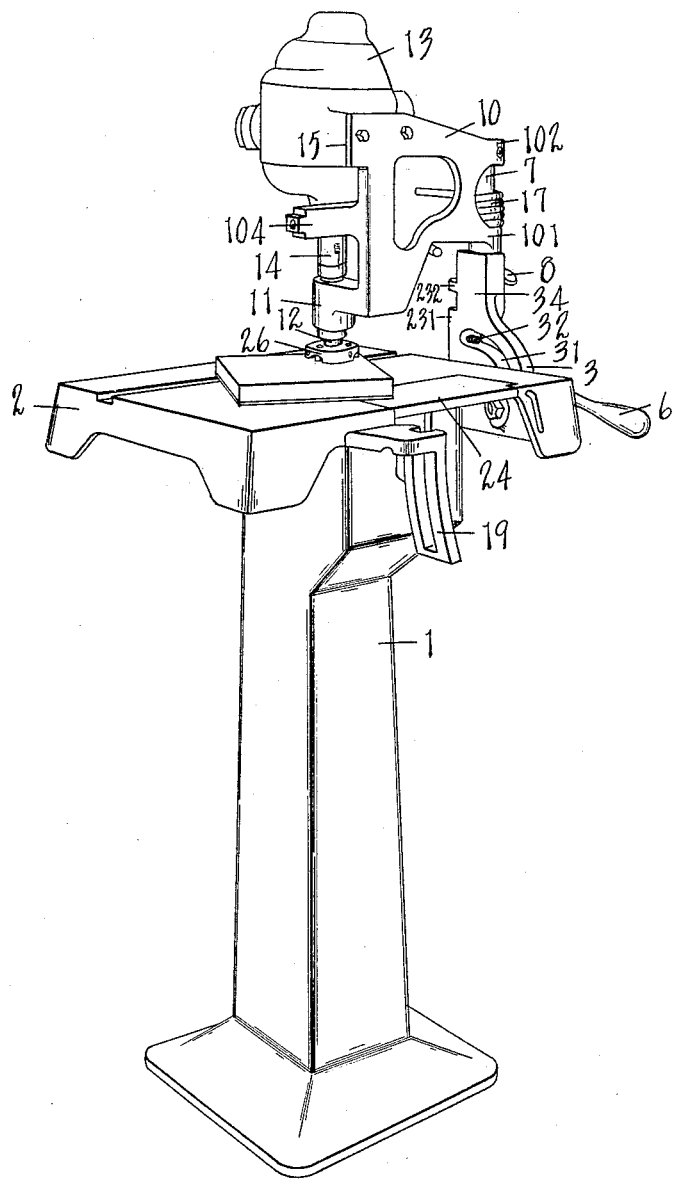

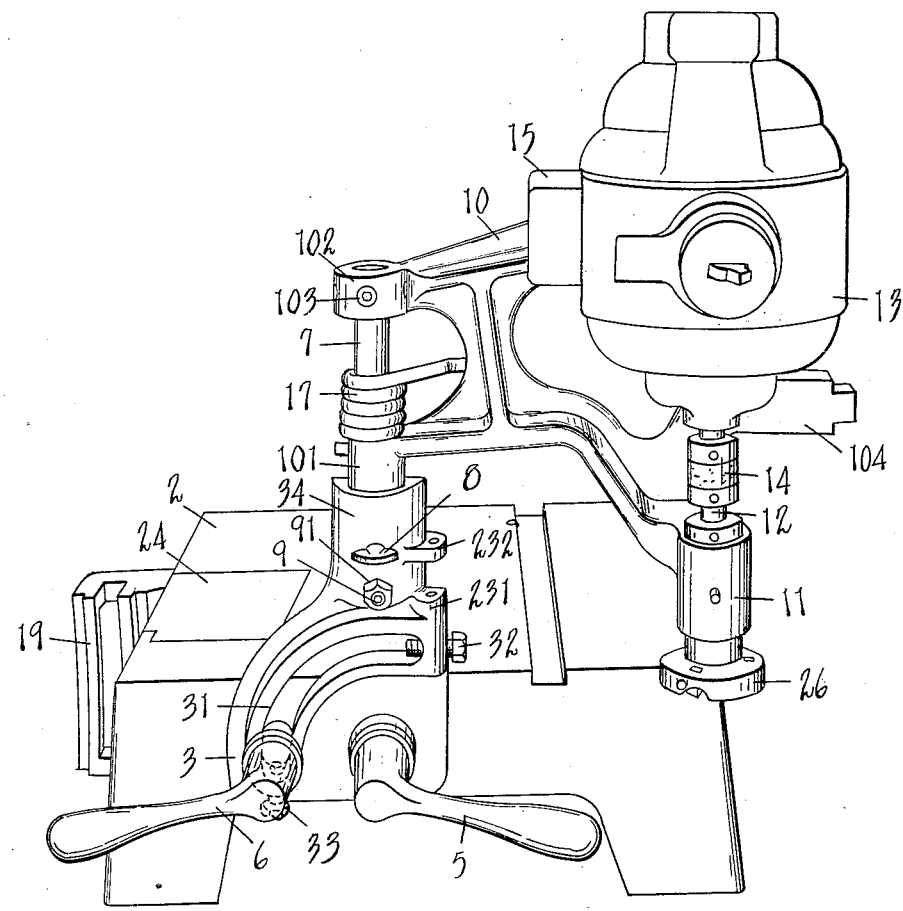
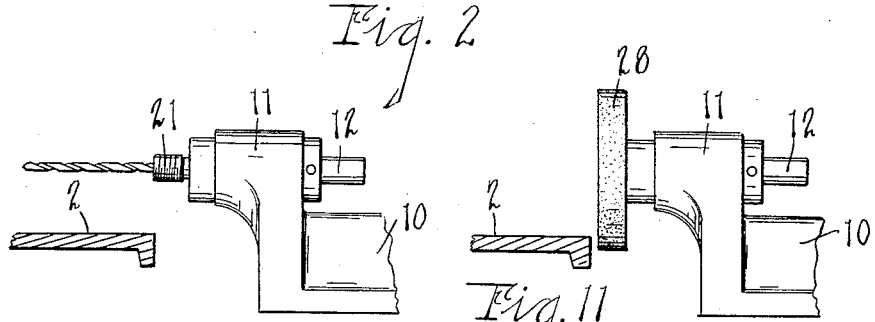

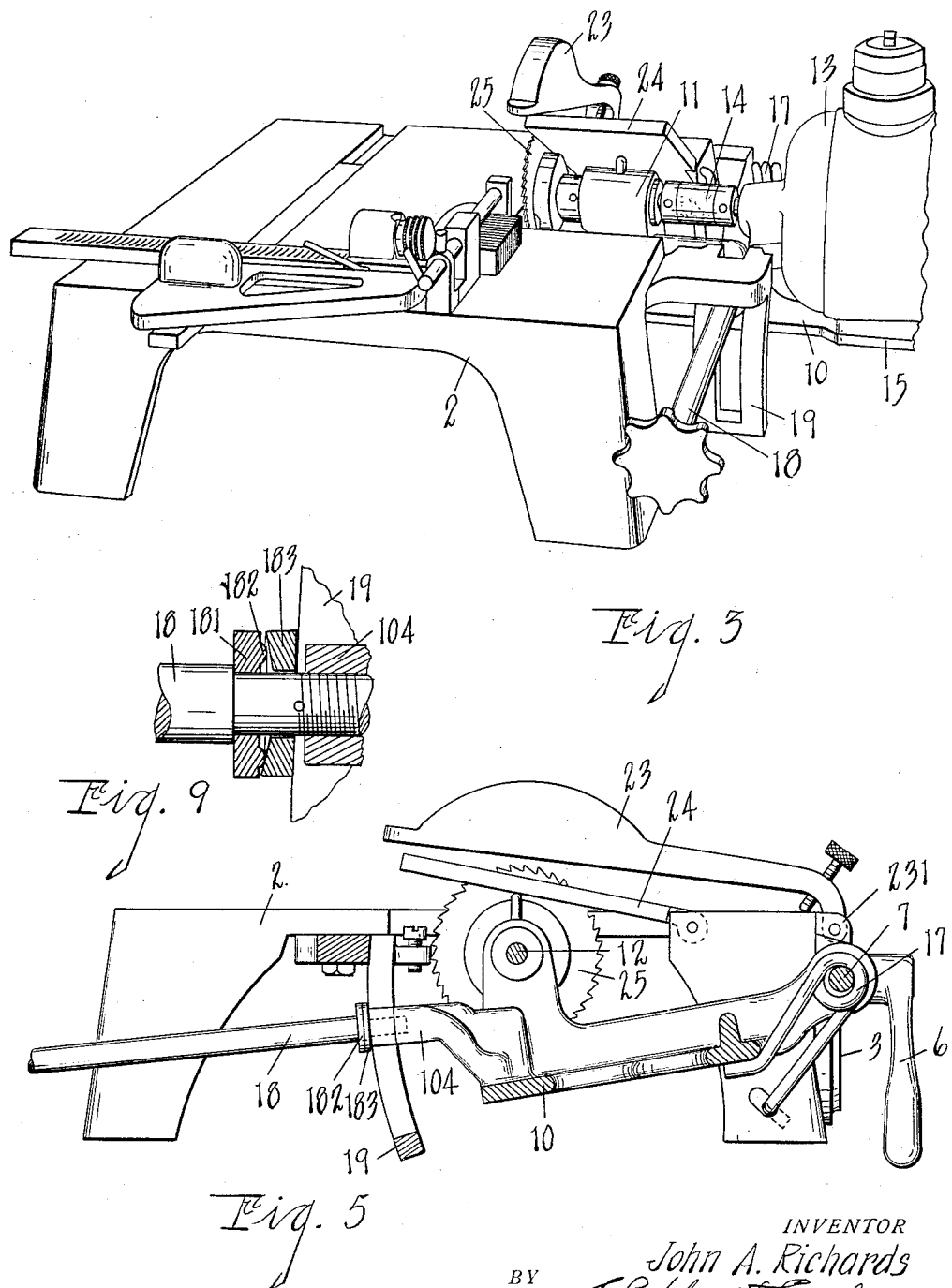

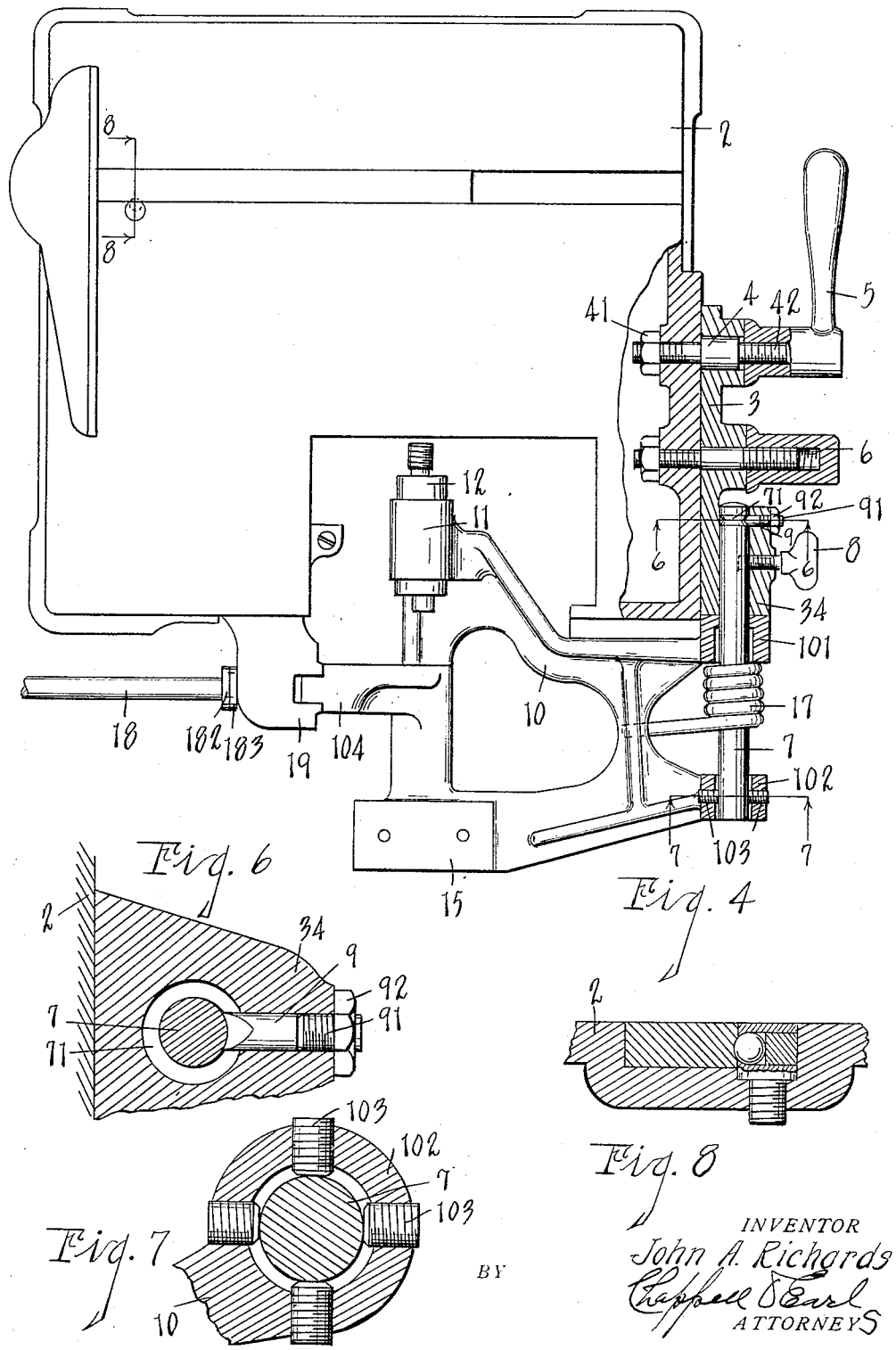

COMBINATION SAW PLANER AND PLANER FOR PRINTERS' USE

Filed Aug. 1, 1931  5 Sheets-Sheet 5

INVENTOR
John A. Richards
BY
ATTORNEYS

Patented Aug. 9, 1932

1,870,466

UNITED STATES PATENT OFFICE

JOHN A. RICHARDS, OF KALAMAZOO, MICHIGAN

COMBINATION SAW PLANER AND PLANER FOR PRINTERS' USE

Application filed August 1, 1931. Serial No. 554,414.

The objects of the invention are:

First, to provide in a single machine for a saw planer and type-high planer by adjustment of the parts.

Second, to provide an improved adjustable drive means for saw planer or planer.

Third, to provide improved counterbalance adjustment means.

Fourth, to provide such a machine with direct electric drive.

Fifth, to provide an improved counterbalance adjustment.

Sixth, to provide for an adjustment to enable the machine to be used in various capacities as a drill or grinder.

Further objects and objects pertaining to details will appear from the description to follow. Preferred embodiments of my invention are fully illustrated in the accompanying drawings, in which:

Fig. 1 is a front oblique perspective view of the machine on a pedestal adjusted as a type-high planer, the saw planer adjuster arm and saw guard being omitted.

Fig. 2 is an enlarged rear perspective view of the machine as seen in Fig. 1 with the pedestal omitted, showing the adjustable bracket in upright position.

Fig. 3 is a front perspective view, the pedestal omitted, of the machine adjusted as a saw planer, the saw planer being raised to the cutting position, and a part of the motor being broken away.

Fig. 4 is an enlarged detail plan view of the structure seen and adjusted as in Fig. 3, the motor and saw planer being omitted, and the supports being in horizontal section to show details of construction.

Fig. 5 is an enlarged detail end elevation partially in section showing the method of adjustment of the saw bracket and support by the adjuster arm, and the connection of the counterbalance spring.

Fig. 6 is an enlarged detail sectional view on line 6—6 of Fig. 4 showing the retainer means for the motor supporting post.

Fig. 7 is an enlarged detail sectional view on line 7—7 of Fig. 4, showing the method of adjusting the post to accurate position, either perpendicular or horizontal.

Fig. 8 is an enlarged detail cross section on line 8—8 of Fig. 4 showing details of the work gage slide.

Fig. 9 is an enlarged detail vertical longitudinal section through the clamp collar and washer of the adjusting arm.

Fig. 10 is an enlarged detail showing the position that the driving mandrel may assume and be supplied with a drill chuck for drilling purposes.

Fig. 11 is a similar view showing a grinder in position for work in connection with the work table.

Figure 12:
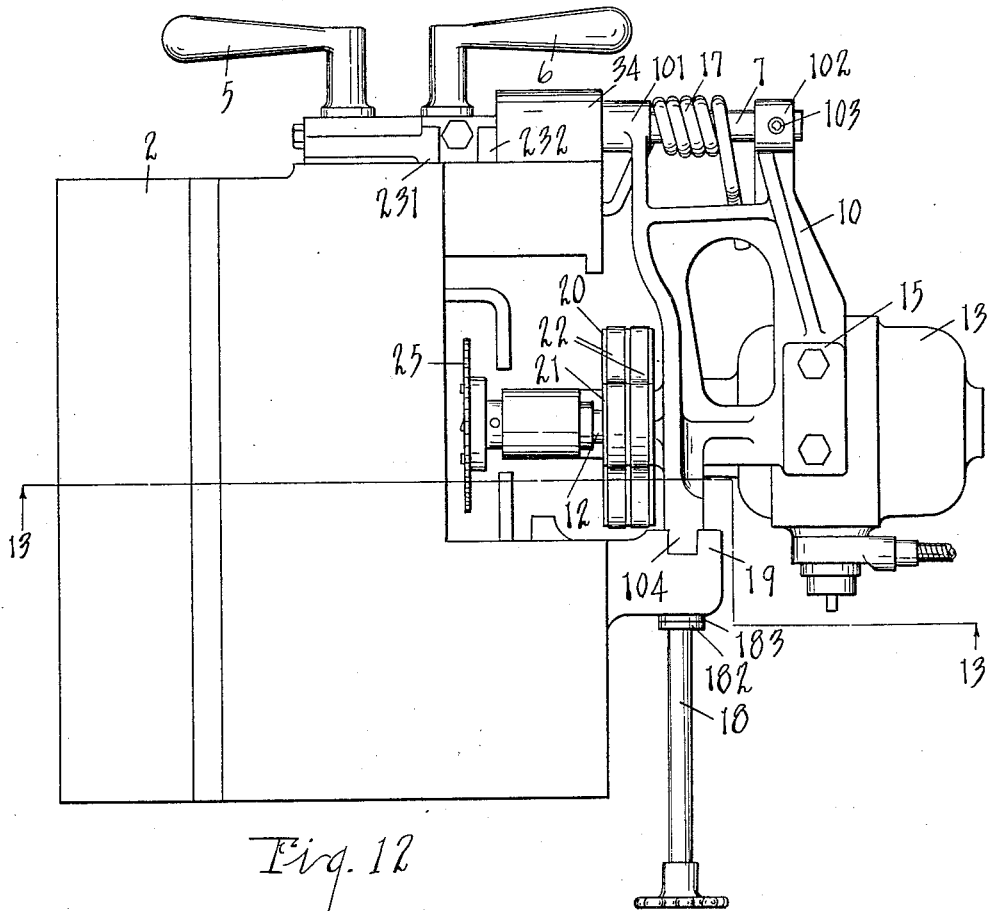
Fig. 12 is a detail plan view of a modified form, somewhat enlarged, showing the method of motor support when speed reduction by V-belt drive is required.

The parts will be identified by their numerals of reference which are the same in all the views.

1 is the machine pedestal. 2 is the table supported on the pedestal. 3 is the adjustable bracket carried at the back of the table. The back of the table is made in a true plane at right angles to the table top surface. The bracket 3 is provided with a flat face that exactly conforms to the vertical plane of the table. 4 is the pivot pin support for said bracket 3. This pivot pin is shouldered and retained in place by lock nut 41. The outer end is screw threaded at 42 and an adjusting wing nut 5 serves to clamp the bracket securely in place and force it against the flat vertical surface at the back of the table. The bracket 3 contains an arc shaped slot 31, see Fig. 2, and a clamping wing nut 6 is disposed in the slot for clamping the bracket in adjusted position, either in vertical or horizontal position. An adjustable stop screw 32, see Fig. 2, is provided to locate the bracket in the exact vertical position and a similar stop screw 33 is at the opposite end of the slot for horizontal adjustment.

A post 7 is disposed in a socket 34 in said bracket 3. This post is seated against one side of the socket by the set thumb screw 8 which engages a hole in the side of the post, see Fig. 6. The post 7 is provided with an annular groove 71 at its inner or lower end. This is engaged by wedge-shaped pin 9 forced into place by stud bolt 91, see Figs. 1 and 6, which is locked in position by lock nut 92. Adjustable frame 10 which carries the motor is supported by the post 7. This frame 10 is forked at its attaching end to the post 7. Fork 101 is counterbored to provide a narrow bearing for engagement with the said post 7. The opposite fork 102 is provided with adjusting means comprising four oppositely disposed set screws 103, see Fig. 7, which enables the very accurate adjustment of the frame 10 on the post 7, which insures the vertical disposition of the mandrel when the frame 10 of the machine is set vertical and in exactly horizontal position when the frame 10 is set horizontal.

11 is the bearing for the saw cutter mandrel 12. 13 is the electric motor which is provided with a suitable coupling 14 for connection to the mandrel 12 for direct drive. When the drive is direct, the motor is supported on the upper side of the bracket at seat 15, see Fig. 4. When it is necessary to increase the speed, the motor is suspended from the under side of this frame on the seat 16, and provided with V-belt drive, see Fig. 13. 17 is the counterbalance spring supported on the post 7, coupled to the pivoted frame 10 at one end and to the table 2 at the other.

The pivoted frame 10 is provided with a controlling lever 18 which is a round bar screw threaded at its inner end and inserted into a projection 104 on the pivoted frame 10. The projection 104 is adjustable in a slotted segment 19 carried by the table and by manipulating the lever 18 the pivoted frame 10 can be clamped in any desired or required position just as is the saw support in my Patent No. 1,723,077 issued August 6, 1929, this adjusting arm and means being identical with the parts there appearing. I have, however, improved the clamp by providing collar 181 with a rib 182 on its face and a loose washer 183 with concave face to receive the said rib, see Fig. 9.

Figure 13:
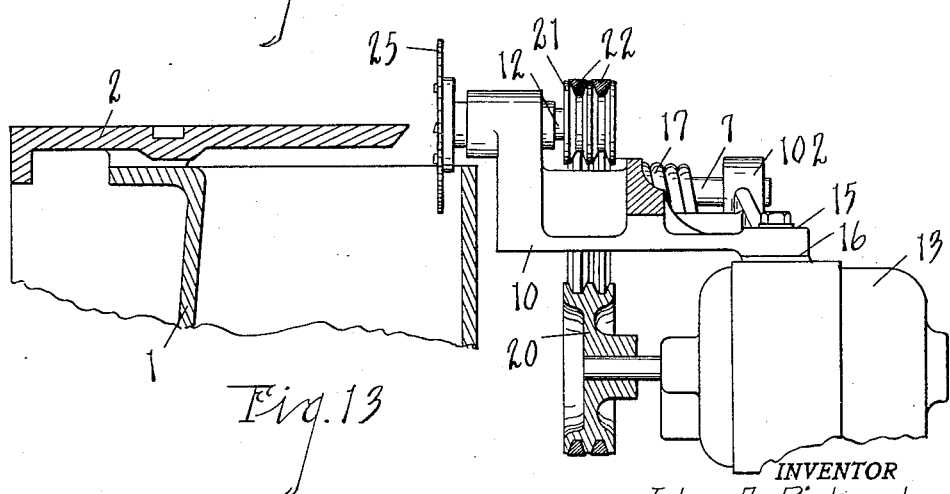
Fig. 13 is a detail sectional view on line 13—13 of Fig. 12 showing the disposition of the motor below the support and the double V-belt drive for the saw lever or spindle.

Figs. 12 and 13 show the modification of my device for use with a belt drive motor, where it is necessary to increase the speed. In that structure, see Figs. 12 and 13, a double V-belt drive is provided. The large pulley 20 is on the motor spindle driving a smaller pulley 21 on the arbor 12, by a pair of V-shaped belts 22, see Figs. 12 and 13. The usual pivoted saw guard 23 and movable table section 24 are provided with the structure, the guard being carried on the ears 231 and 232, see Figs. 2 and 5. As this invention does not relate to the same, I do not describe the same in further detail here.

When the arbor is disposed in the horizontal position, I provide it with a trimming saw planer 25 for cutting off printers' lead or for trimming blocks or the like for printers' use. When the arbor is turned to the vertical position, I provide the same with a type-high disk planer 26 or with a router or other appliance. When in the horizontal position, the arbor may be provided with a drill chuck 27 or a grinder 28, see Figs. 8 and 9, which may be attached to the arbor in place of the trimmer saw, and made use of.

It will be readily understood by inspecting Fig. 2 how the motor can be shifted from horizontal to vertical position. The wing clamp nuts 5 and 6 are loosened and the bracket 3 is adjusted to the vertical position, being stopped in that position by the adjustable stop 32. Preliminary to such adjustment, the lever 18 is removed and the saw guard 23 is detached. In this position the type-high planer disk 26 is put into position. When it is desired to use the saw trim, the clamp nuts 5 and 6 are released, the bracket 3 is swung over to the horizontal position against suitable stops, the counterbalance spring 17 is adjusted in engagement, the projection 104 on the pivoted frame 10 is passed into the segment 19, and the adjusting lever 18 is inserted, and then the pivoted frame is clamped in place.

When work is adjusted on the table, the saw is released by the handle 18, brought up to the proper elevation, and the work moved across it. When the work is finished, the saw is depressed and the table closes over the top, leaving a smooth work table above. The table is provided with any suitable gages for holding the work. The work is engaged by the slide gage, the slide of which is retained by the ball guide seen in Fig. 8. My invention does not pertain to such gages, and I have not described them here.

If it is desired to do drilling or grinding, the trimmer saw is replaced by a drill or grinder, as illustrated in Figs. 8 and 9.

It is clear that my machine can be a good deal modified without departing from my invention. I believe it possesses special merits in the particular form shown and I therefore desire to claim it specifically and also broadly as pointed out in the appended claims.

Having thus described my invention, what I claim as new and desire to secure by Letters Patent is:

1. In a combination saw trim and planer machine, a suitable work table having a vertical rear wall, a bracket having a face corresponding to the said wall, said bracket being slotted and having clamp bolts for bolting the same in place, an electric motor having a motor frame carried by said bracket, an adjustable post in the said bracket grooved and retained by a suitable bolt, the opposite end being adjusted by oppositely disposed set screws to adjust its alinement, a counterbalance spring on the said post between the said frame and table for counterbalancing when the motor and frame are disposed in horizontal position, and a detachable adjusting arm for the said frame for clamping the frame in working position when the post is horizontal and permitting the same to be free to turn when in the vertical position.

2. In a combination saw trim and planer machine, a suitable work table having a vertical rear wall, a bracket having a face corresponding to the said wall, said bracket being slotted and having clamp bolts for bolting the same in place, an electric motor having a motor frame carried by said bracket, an adjustable post in the said bracket grooved and retained by a suitable bolt, the opposite end being adjusted by oppositely disposed set screws to adjust its alinement, and a detachable adjusting arm for the said frame for clamping the frame in working position when the post is horizontal and permitting the same to be free to turn when the post is in the vertical position to serve as a pivotal support.

3. In a combination saw trim and planer machine, a suitable work table having a vertical rear wall, a bracket having a face corresponding to the said wall, said bracket being slotted and having clamp bolts for bolting the same in place, an electric motor having a motor frame carried by said bracket, and an adjustable post in the said bracket grooved and retained by a suitable bolt, the opposite end being adjusted by oppositely disposed set screws to adjust its alinement.

4. In a compound machine, the combination of a work table, an adjustable bracket pivoted to the said work table and adapted to adjust from vertical to horizontal position, clamps for retaining the same in adjusted position, a motor and support secured to the said bracket and adapted to swing to different elevations when the bracket is disposed in the horizontal position, and means for locking the motor and support in adjusted position, and a counterbalance spring for said motor.

5. In a compound machine, the combination of a work table, an adjustable bracket pivoted to the said work table and adapted to adjust from vertical to horizontal position, clamps for retaining the same in adjusted position, a motor and support secured to the said bracket and adapted to swing to different elevations when the bracket is disposed in the horizontal position, and means for locking the motor and support in adjusted position.

6. In a machine of the class described, the combination of a work table, a pivot post, a frame adjustable thereon, a motor mounted on said frame, a segment carried by the table, a member on the adjustable frame conformed to the said segment, an adjusting arm screw threaded into the said member, a fixed collar thereon having an annular rib on its face, and a loose washer having a concave face to be engaged by said rib for clamping the frame in adjusted position.

7. In a compound machine, the combination of a suitable work table having a vertical rear wall, an adjustable bracket carried on the rear wall and having adjusting means for securing it in vertical and horizontal position, a motor carried by said bracket to adjust from vertical to horizontal position, and a pivotal adjustable connection from the said motor to the said adjustable bracket, whereby the said motor can be adjusted to different elevations when the pivot is horizontal.

8. In a saw trimmer machine, the combination of a suitable work table, a horizontal pivot support carried thereby, an adjustable frame on the said pivot support, an electric motor on the said frame, and a saw planer arbor direct connected to said motor.

9. In a saw trimmer machine, the combination of a suitable work table, a horizontal pivot support carried thereby, an adjustable frame on the said pivot support, an electric motor on the said frame, and a saw planer arbor connected to said motor.

In witness whereof I have hereunto set my hand.

JOHN A. RICHARDS.